(12) United States Patent
Kagawa (10) Patent No.: US 7,003,845 B2
(45) Date of Patent: Feb. 28, 2006

(54) WIPER SYSTEM

(75) Inventor: Mamoru Kagawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/714,071

(22) Filed: Nov. 14, 2003

(65) Prior Publication Data
US 2004/0093680 A1 May 20, 2004

(30) Foreign Application Priority Data
Nov. 15, 2002 (JP) .............................. 2002-331818

(51) Int. Cl.
*B60S 1/24* (2006.01)
*B60S 1/18* (2006.01)
(52) U.S. Cl. .................... 15/250.3; 15/250.31
(58) Field of Classification Search ............. 15/250.21, 15/250.23, 250.3, 250.31, 250.14, 250.27; 74/42, 43
See application file for complete search history.

(56) References Cited

U.S. PATENT DOCUMENTS 1,539,930 A * 6/1925 Berger .................. 185/37
5,079,794 A * 1/1992 Lake .................... 15/250.23

FOREIGN PATENT DOCUMENTS

| DE | 626710 | | 2/1936 |
| DE | 197 25 290 C1 | | 6/1997 |
| EP | 0 326 458 | | 8/1989 |
| EP | 0 689 976 A1 | | 1/1996 |
| GB | 1190426 | * | 5/1970 |
| GB | 1561813 | * | 3/1980 |
| JP | 1-229747 | | 11/1989 |
| JP | 2001-80463 | | 3/2001 |

* cited by examiner

Primary Examiner—Gary K. Graham
(74) Attorney, Agent, or Firm—Hamre, Schumann, Mueller & Larson, P.C.

(57) ABSTRACT

A wiper system 10 comprising a pivot shaft 41, a lever portion 12 provided on the pivot shaft 41 at right angles, a wiper arm 14 attached to the lever portion, and a wiper blade 15 attached to the wiper arm is constructed such that, when a windscreen 17 is viewed from a surface side thereof, the pivot shaft is disposed at a position which is displaced towards a center of the windscreen from an edge 35 thereof, such that the lever portion extends in such a manner that a distal end 42 thereof always protrudes from the edge of the windscreen, and such that the lever portion and the wiper arm are integrally connected together so as to form and maintain an acute angle θ.

3 Claims, 8 Drawing Sheets

WIPER SYSTEM

BACKGROUND OF THE INVENTION

The present invention relates to a wiper system which can increase a wiping area on a glass surface with a simple construction.

A conventional wiper system has a link mechanism provided between a wiper motor and a wiper arm (for example, refer to Patent Literature No. 1).

[Patent Literature No. 1]

The Unexamined Japanese Patent Application No. Heil-229747 (FIGS. 2A and 2B on page 3)

Referring to the drawings, Patent Literature No. 1 will be described in detail below.

Figure 8A:
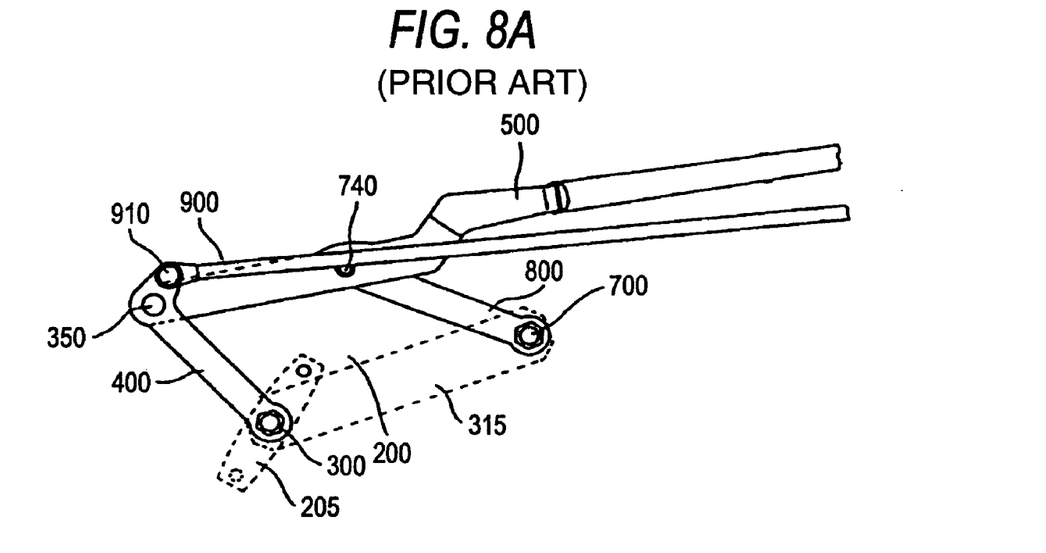
FIGS. 8A and 8B illustrate the conventional vehicle wiper system.
Figure 8B:
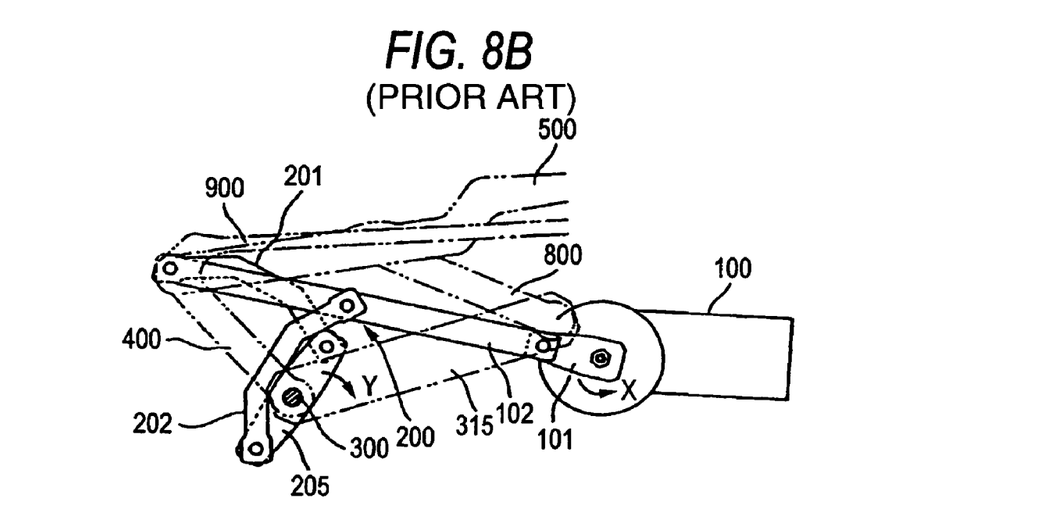

FIGS. 8A and 8B are explanatory views explaining a conventional vehicle wiper system (FIGS. 8A and 8B represent, respectively, a copy of FIGS. 2A and 2B attached to Patent Literature No. 1).

In FIG. 8A, the conventional vehicle wiper system is constructed such that an oscillating arm 400 and a guide arm 800, which are both provided outside a vehicle body, are coupled together via a link mechanism 200 provided inside the vehicle body, one end of the oscillating arm 400 is supported by a support shaft 300 which is rotatably fitted in the vehicle body, and a main wiper arm 500 is rotatably supported at the other end of the oscillating arm 400 by means of a rivet 350. In addition, the wiper system is constructed such that one end of the guide arm 800 is supported by a support shaft 700 which is rotatably fitted in the vehicle body, the main wiper arm 500 is rotatably supported at the other end of the guide arm 800 by means of a rivet 740, a wiper blade, which is not shown, is attached to a distal end of the main wiper arm 500, one end of an auxiliary wiper arm 900 is coupled to the wiper blade via a support stay, and the other end of the auxiliary wiper arm 900 is coupled to the other end of the oscillating arm 400.

In FIG. 8B, the link mechanism 200 provided inside the vehicle body includes substantially V-shaped arms 201, 202 and an output lever 205 and is coupled to a direct-current d-rive motor 100 via a drive arm 102 and a rotating arm 101.

The operation of the wiper system constructed as is described heretofore will briefly be described. Firstly, when the direct-current drive motor 100 rotates in a direction indicated by an arrow X, the drive arm 102 moves, and the output lever 205 rotates in a direction indicated by an arrow Y, whereby the oscillating arm 400 revolves, and the main wiper 500 also revolves. Then, when the rotating arm 101 rotates half a revolution (180°) or more, the main wiper 500 starts to return.

In the vehicle wiper system shown in FIGS. 8A and 8B, components are required which include the oscillating arm 400 and the guide arm 800 which turn the main wiper arm 500, the support shafts 300, 700 which accompany the oscillating arm 400 and the guide arm 800, respectively, and the output lever 205, whereby the construction of the wiper system becomes complex, the number of components in the wiper system is increased, and eventually the production costs is increased.

In addition, in the conventional vehicle wiper system, there are provided a number of coupling portions where the oscillating arm, the guide arm 800 and the output lever 205 are coupled rotatably, whereby sources are increased where wear and noise, which are inherent in those coupling portions, are caused.

SUMMARY OF THE INVENTION

Then, an object of the invention is to provide a wiper system which can secure a larger wiping area with a simple construction while reducing the production costs.

With a view to attaining the object, according to a first aspect of the invention, there is proposed a wiper system comprising a rotating center spindle rotated by a wiper motor, a lever portion provided on the rotating center spindle, a wiper arm attached to the lever portion and a wiper blade attached to the wiper arm, whereby a windscreen can be wiped by the wiper blade, the wiper system being characterized in that the lever portion is constructed such that a rotating center of the lever portion which is located at one end thereof is provided at a position which is situated between a proximal end portion and a free end portion of the wiper arm and spaced away from the wiper arm by a predetermined distance toward a center of the windscreen when the wiper arm is situated a stop position where the wiper arm is located at a lower edge of the windscreen and such that the other end of the lever portion extends to the proximal end portion of the wiper arm.

The lever portion and the wiper arm turn together as the rotating center spindle rotates. When the lever portion turns, the wiper arm turns and, due to the length of the lever portion, moves in such a manner as to extend outwardly for every turn. Consequently, a larger wiping area can be secured with the simple construction.

According to a second aspect of the invention, there is proposed a wiper system as set forth in the first aspect of the invention, wherein, when the windscreen is viewed from a surface side thereof, the rotating center spindle is disposed at a position displaced towards the center of the windscreen from the edge thereof, wherein the lever portion provided on the rotating center spindle extends such that a distal end thereof always protrudes from the edge of the windscreen, and wherein the lever portion and the wiper arm are integrally connected together so as to form and maintain an acute angle therebetween.

Since the rotating center spindle is provided so as to be displaced towards the center of the windscreen from the edge thereof and the distal end of the lever portion is made to protrude from the edge of the windscreen, the wiper arm can be set at a lowermost position along the edge of the windscreen. Consequently, the external appearance can be improved, and the field of view from the passenger compartment can also be widened.

According to a third aspect of the invention, there is proposed a wiper system as set forth in the first aspect, wherein the lever portion and the wiper arm are coupled together via a connecting member having a length larger in value than a thickness of the windscreen, and wherein the rotating center spindle is provided inside a vehicle.

The rotating center spindle, the lever portion and most part of the connecting member are accommodated inside the vehicle. As a result, only the wiper arm which is fixed to the end of the connecting member is disposed on the surface of the windscreen, whereby the external appearance can be improved.

DETAILED DESCRIPTION OF THE PREFERRED EMBODIMENTS

An embodiment of the invention will be described below by reference to the accompanying drawings. Note that the drawings are viewed in a direction in which reference numerals therein are oriented.

Figure 1:
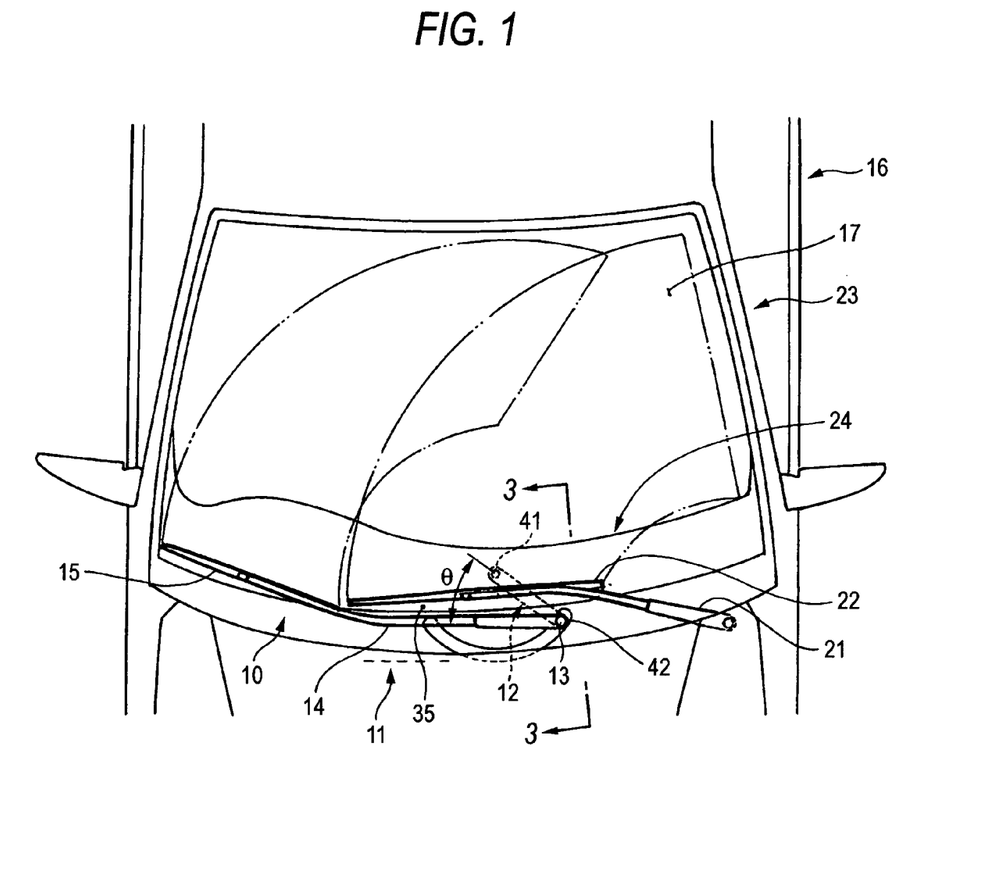
FIG. 1 is a perspective view of a wiper system according to the invention.

FIG. 1 is a perspective view of a wiper system according to the invention, and the wiper system 10 includes a wiper link mechanism 11, a lever portion 12 attached to this wiper link mechanism 11, a wiper arm 14 attached to the lever portion 12, a wiper blade 15 attached to the wiper arm 14 and a control unit, which is not shown and wipes a windscreen 17 of a vehicle 16. Reference numeral 13 denotes a connecting member of the lever portion 12, reference numeral 21 a wiper arm for a front seat passenger which is attached to the wiper link mechanism 11, reference numeral 22 a wiper blade attached to the wiper arm 21, reference numeral 23 a passenger compartment, and reference numeral 24 an instrument panel.

Figure 2:
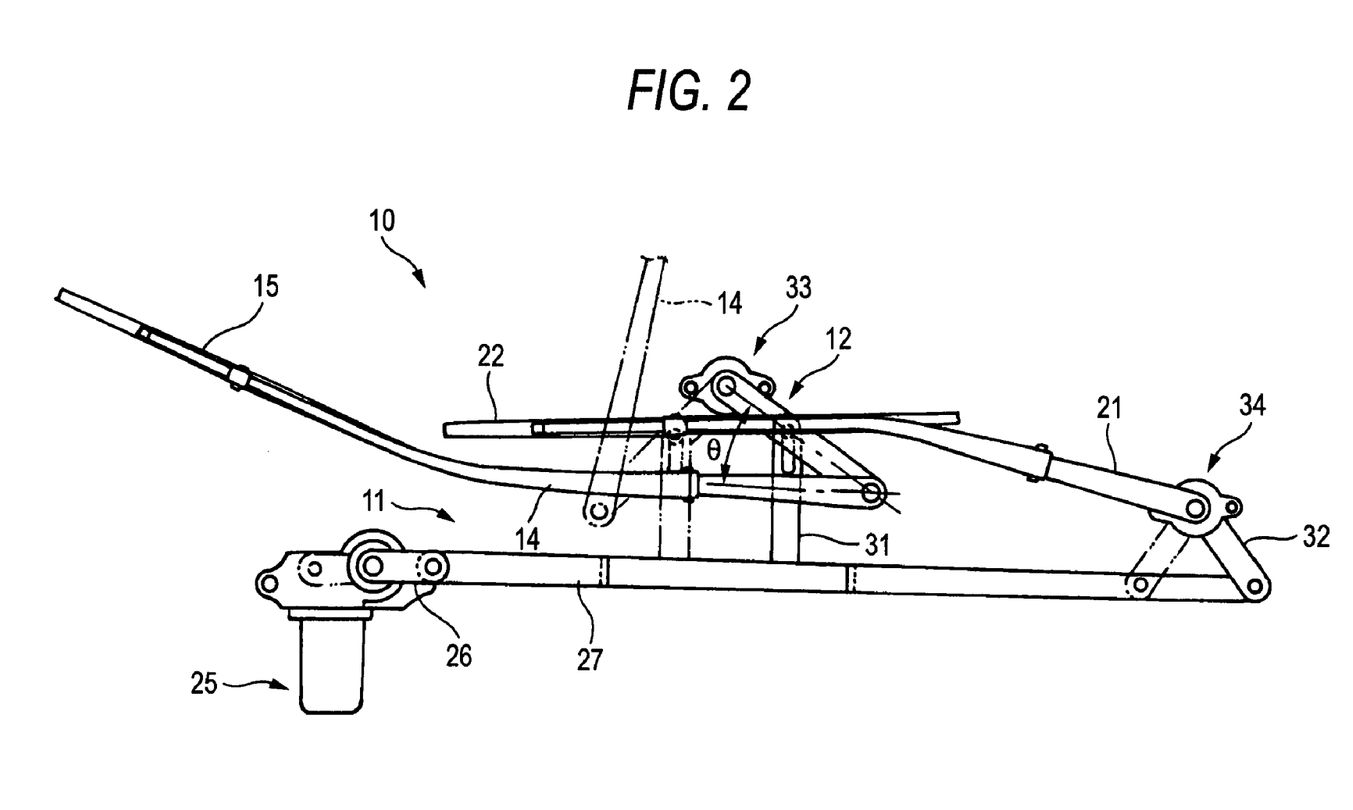
FIG. 2 is a plan view of the wiper system according to the invention.

FIG. 2 is a plan view of the wiper system according to the invention and shows the wiper link mechanism 11, the lever portion 12, the wiper arms 14, 21 and the wiper blades 15, 22 of the wiper system 10, as well as a state in which the lever portion 12 and the wiper arm 14 are integrally connected together in such a manner as to form and maintain an acute angle of θ therebetween. Reference numeral 25 denotes a wiper motor.

The wiper link mechanism 11 includes a first link 26 attached to the wiper motor 25, a second link 27 coupled to the first link 26 in such a manner as to freely oscillate, a third link 31 fixed at a central portion of the second link 27, a fourth link 32 coupled to an end of the second link 27 in such a manner as to freely oscillate, a first pivot 33 connected to the third link 31 and a second pivot 34 connected to the fourth link 32.

Note that the wiper link mechanism 11 is one of examples and may be constructed differently as conditions such as vehicle design differ.

Figure 3:
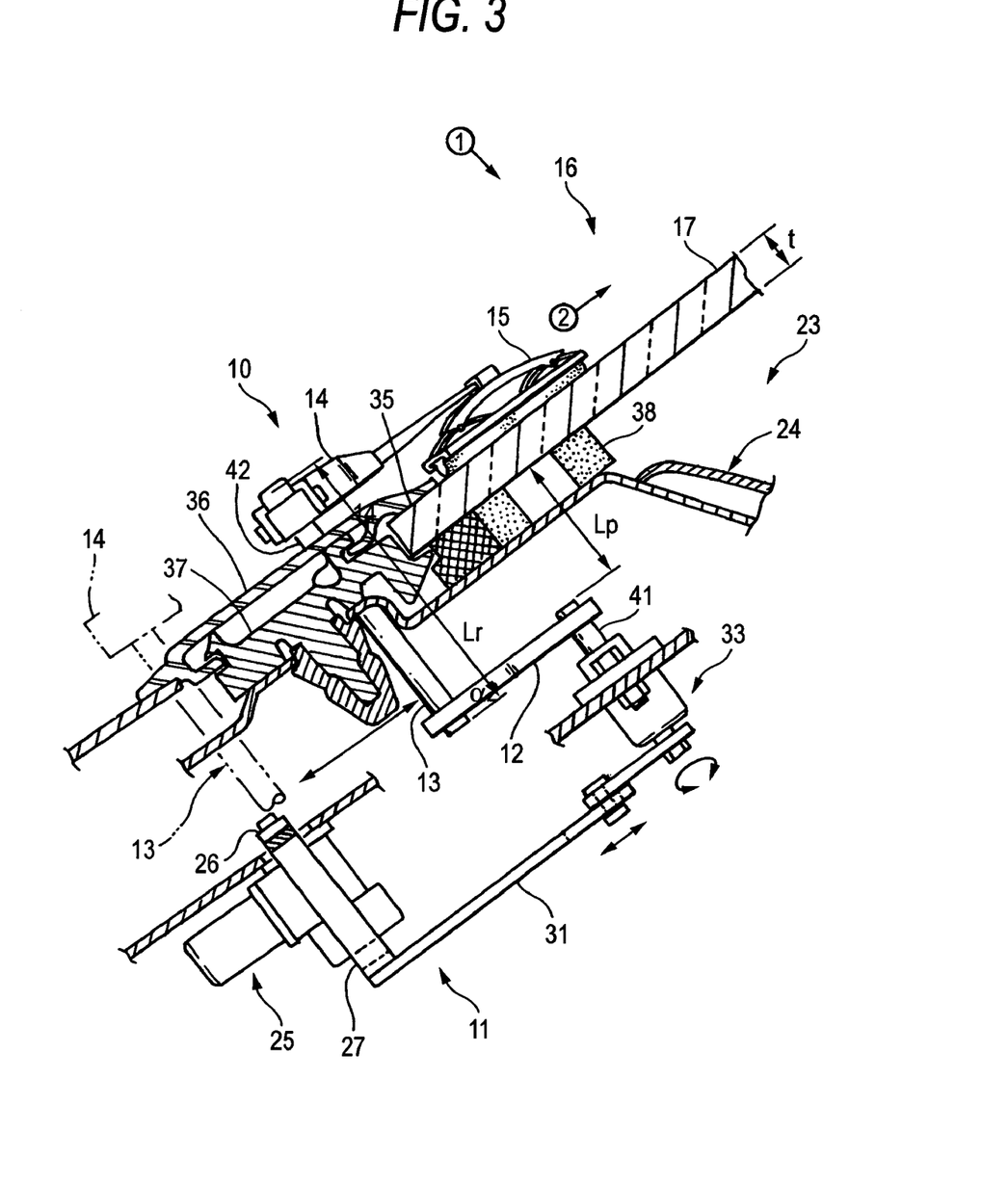
FIG. 3 is a sectional view taken along the line 3—3 in FIG. 1.

FIG. 3 is a sectional view taken along the line 3—3 in FIG. 1 and illustrates that a lever portion 12 is attached to the first pivot 33 of the wiper link mechanism 11 shown at the bottom of the drawing, and the wiper arm 14 is attached to the lever portion 12 via a connecting member 13, whereby the windscreen 17 is wiped with the wiper blade 15 attached to the wiper arm 14.

The windscreen 17 has a lower molding 36 which supports a lower edge 35 thereof, a seal 37 and a rubber 38. Reference character "t" denotes the thickness of the windscreen 17.

The length of the connecting member 13 is Lr, which takes a larger value than the "t", the thickness of the windscreen 17.

The first pivot 33 has a rotating center spindle which is rotated by means of the wiper motor 25, here, a pivot shaft 41 as a rotating center spindle which revolves via the first link 26, the second link 27 and the third link 31, and the pivot shaft 41 is provided inside the vehicle 16.

Here, "inside the vehicle 16" means specifically a predetermined distance Lp away from a back of the windscreen 17, and in this case, the pivot shaft 41 is disposed on a rear side of the instrument panel 24.

In addition, in the wiper system 10, when the windscreen 17 is viewed from a front side thereof (a direction indicated by an arrow ①), the pivot shaft 41 which is the rotating center spindle is disposed at a position displaced towards the center of the windscreen 17 from the edge 35 thereof (in a direction indicated by an arrow ②), and the lever portion 12 provided on this pivot shaft 41 extends such that a distal end 42 thereof always protrudes from the edge 35 of the windscreen 17, the lever portion 12 and the wiper arm 14 being integrally connected in such a manner that the angle θ (refer to FIG. 2) does not change.

Figure 4:
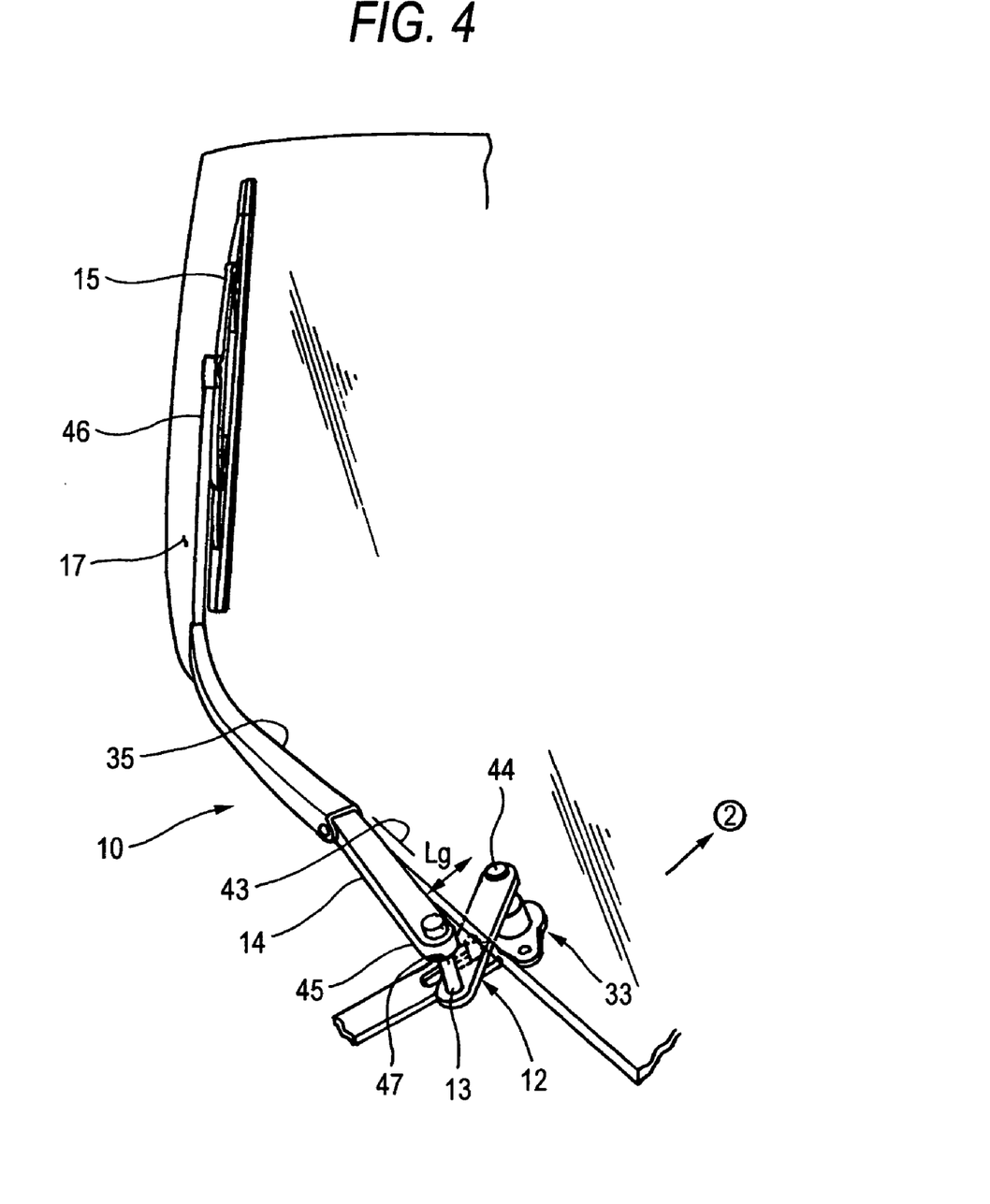
FIG. 4 is a perspective view of a lever portion according to the invention.

FIG. 4 is a perspective view of the lever portion according to the invention, and specifically, the lever portion 12 is such that a rotating center 44 of the lever portion 12 which is located at one end thereof is provided at a position which is situated between a proximal end portion 45 and a free end portion of the wiper arm 14 and spaced away from the wiper arm 14 by a distance Lg toward the center of the windscreen 17 (in a direction indicated by an arrow ②) when the wiper arm 14 is situated a stop position 43 where the wiper arm 14 is located at the lower edge 35 of the windscreen 17 and such that the other end 47 (corresponding to the distal end 42 in FIG. 3) of the lever portion 12 extends to the proximal end portion 45 of the wiper arm 14.

The function of the wiper system that is described heretofore will be described next.

Figure 5A:
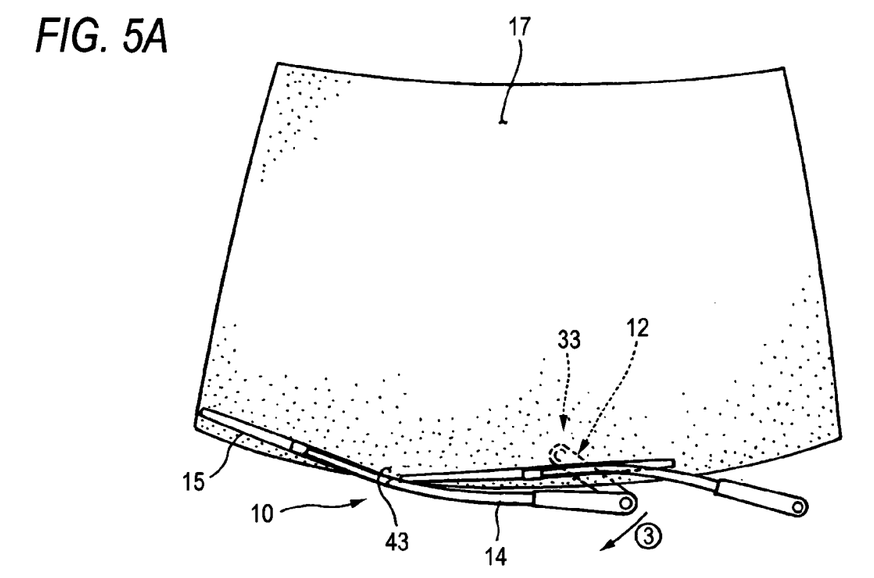
FIGS. 5A and 5B illustrate a first function of the wiper system according to the invention.
Figure 5B:
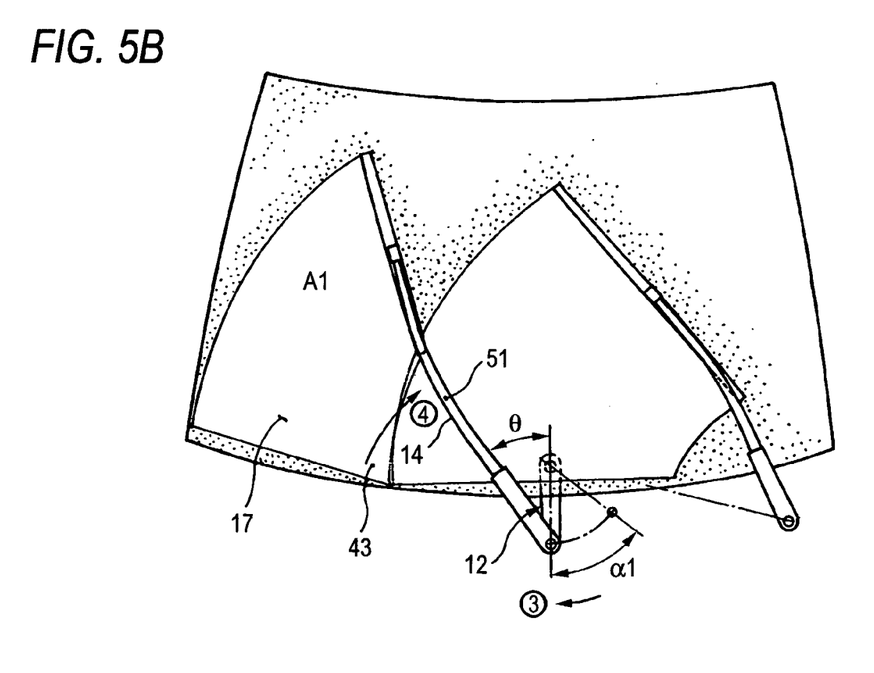

FIGS. 5A and 5B are drawings illustrating a first function of the wiper system according to the invention.

In FIG. 5A, the lever portion 12, the wiper arm 14 and the wiper blade 15 of the wiper system 10 all wait at the stop position 43. When a wiper actuating switch is operated to be turned "on" in this waiting condition, the wiper motor and the first pivot 33 rotate, and then the lever portion 12 starts turning in a direction indicated by an arrow ③.

In FIG. 5B, when the lever portion 12 starts turning as indicated by the arrow 3 by a turning angle α1, the wiper arm 14, which is integrally connected in such a manner as to maintain the angle θ, turns as indicated by an arrow 4 while maintaining the angle θ to reach an intermediate position 51, where the windscreen 17 is wiped by an area A1.

Figure 6:
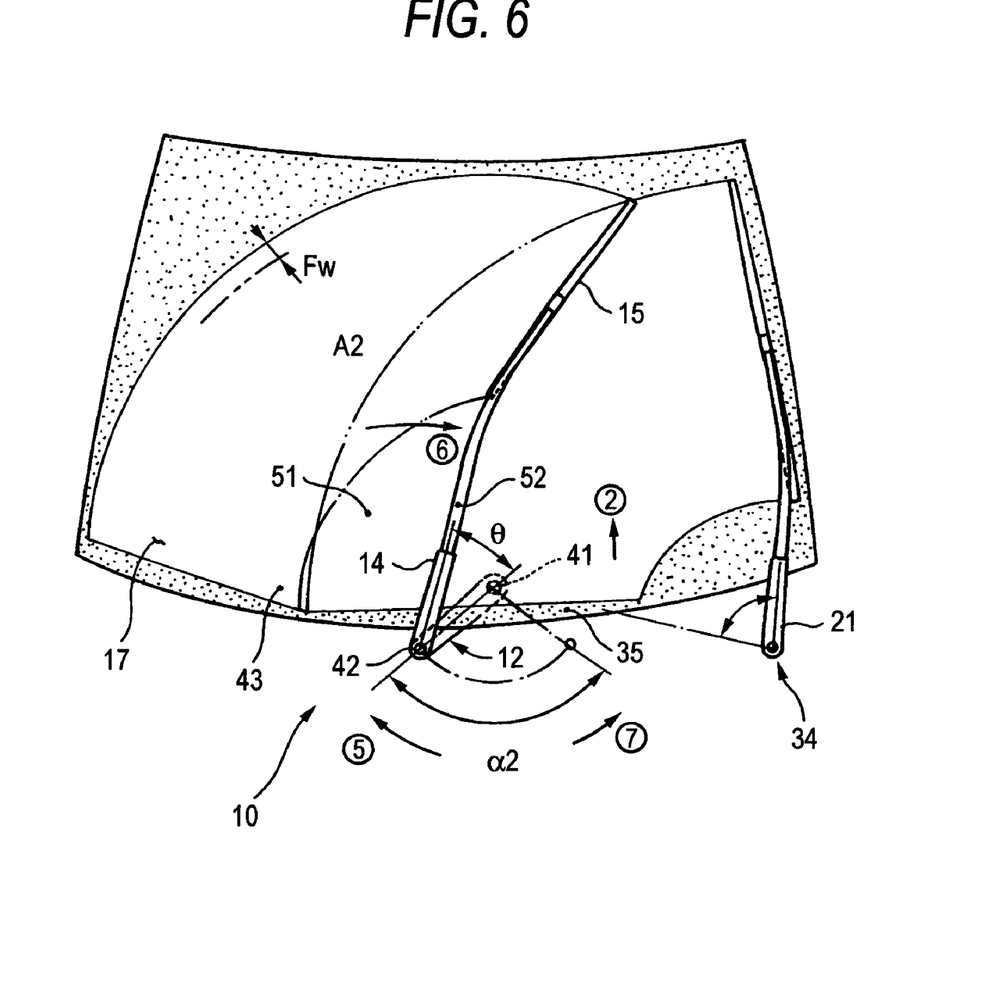
FIG. 6 illustrates a second function of the wiper system according to the invention.

FIG. 6 is a drawing illustrating a second function of the wiper system according to the invention.

When the lever portion 12 continues to turn as indicated by an arrow 5 by a turning angle α2 (which includes the angle α1), the wiper arm 14 turns as indicated by an arrow ⑥. As this occurs, due to the provision of the lever portion 12, the wiper arm 14 moves in such a manner as to extend outwardly by a dimension Fw for every turn. Thereafter, the wiper arm 14 reaches an upper reversal position 52, where the windscreen 17 is wiped by a wiping area A2 (which includes the area A1) Then, the lever portion 12 returns as indicated by an arrow 7 after it reaches the upper reversal position 52.

The outer most wiping position of the wiping area A2 becomes larger by the dimension Fw than a general outermost wiping position indicated by a chain double-dashed line due to the lever portion 12. A wiper system having the general construction is such as substantially similar to the wiper system for the front seat passenger including the second pivot 34 and the wiper arm 21.

Thus, in the wiper system 10, the wiping area can be increased by the turning lever portion 12. Consequently, the larger wiping area can be secured with the simple construction.

Figure 7A:
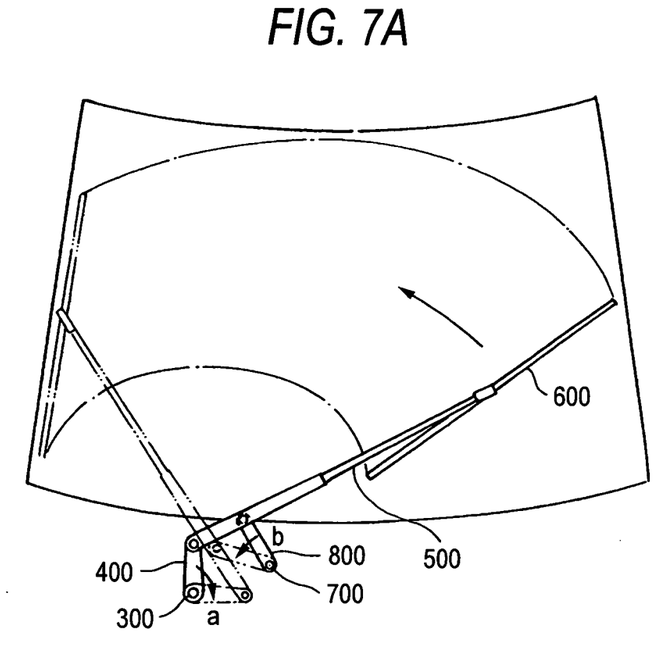
FIGS. 7A and 7B illustrate a comparison between the wiper system and a conventional vehicle wiper system.
Figure 7B:
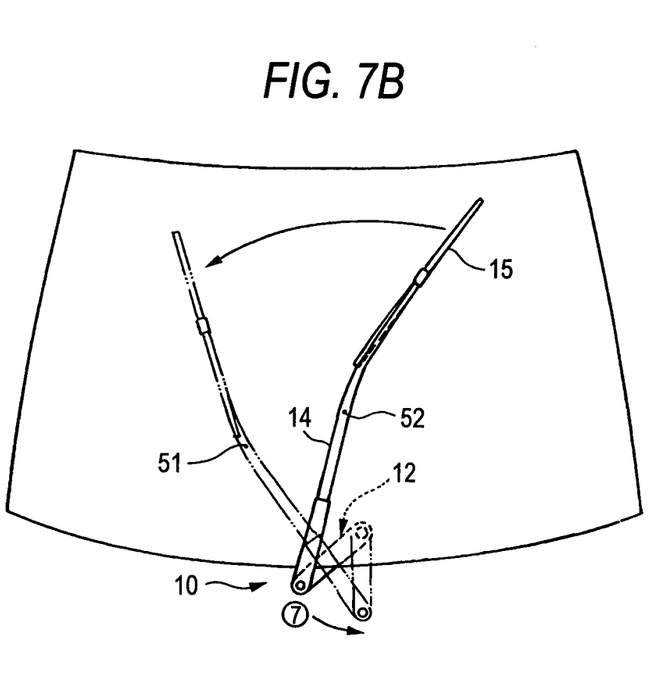

FIGS. 7A and 7B are drawings illustrating a comparison between the wiper systems.

FIG. 7A illustrates the operating conditions of the conventional wiper system shown in FIGS. 8A and 8B (each a copy of FIGS. 9 and 11 of Patent Literature No. 1).

When the drive motor rotates, the oscillating arm 400 rotates as indicated by an arrow "a" about the support shaft 300 by means of the drive motor, and the guide arm 800 rotates as indicated by an arrow "b" about the support shaft 700, whereby the windscreen is wiped by means of a wiper blade 600 attached to the main wiper arm 500.

FIG. 7B is such as to represent FIGS. 6 and 5B, and illustrates a condition where the wiper arm 14 returns from its upper reversal position 52 in FIG. 6 to the intermediate position 51 in FIG. 5B.

When the wiper motor rotates, the lever portion 12 turns as indicated by the arrow ⑦, and the windscreen is wiped by means of the wiper blade 15 attached to the wiper arm 14.

As is clear from the drawing, the wiper system 10 is simpler in construction than the wiper system shown in FIG. 7A, and the number of components involved can be reduced according to the invention.

Consequently, according to the invention, the construction becomes simpler and the production costs can be reduced.

As shown in FIG. 1, since the pivot shaft 41 is disposed at the position displaced towards the center of the windscreen 17 from the edge 35 thereof (in the direction indicated by the arrow 2 in FIG. 6), the lever portion 12 provided on this pivot shaft 41 extends such that the distal end 42 thereof always protrudes from the edge 35 of the windscreen 17, and the lever portion 12 and the wiper arm 14 are integrally connected so as to form and maintain the angle θ, the stop position of the wiper arm 14 can be set to the lowermost position along the edge 35 of the windscreen 17. Consequently, the external appearance can be improved and the field of view from the passenger compartment can be widened.

As shown in FIG. 3, since the lever portion 12 and the wiper arm 14 are coupled together via the connecting member 13 having the length Lr which is larger in value than the thickness "t" of the windscreen 17, and the pivot shaft 41 is provided inside the vehicle 16, only the wiper arm 14 is disposed on the surface of the windscreen 17, whereby the external appearance can be improved.

Note that while the shape of the lever portion 12 illustrated in this embodiment is flat, the shape thereof can be modified arbitrarily.

While the connecting member 13 is of a rod-like shape, the shape thereof may be modified arbitrarily.

Being constructed as is described heretofore, the invention provides the following advantages.

According to the first aspect of the invention, since the lever portion is constructed such that the rotating center of the lever portion which is located at the one end thereof is provided at the position which is situated between the proximal end portion and the free end portion of the wiper arm and spaced away from the wiper arm by the predetermined distance toward the center of the windscreen when the wiper arm is situated the stop position where the wiper arm is located at the lower edge of the windscreen and such that the other end of the lever portion extends to the proximal end portion of the wiper arm, when the lever portion turns, the wiper arm turns and, due to the length of the lever portion, moves in such a manner as to extend outwardly for every turn. Consequently, the larger wiping area can be secured with the simple construction.

According to the second aspect of the invention, since, when the windscreen is viewed from the surface side thereof, the rotating center spindle is disposed at the position displaced towards the center of the windscreen from the edge thereof, the lever portion provided on the rotating center spindle extends such that the distal end thereof always protrudes from the edge of the windscreen, and the lever portion and the wiper arm are integrally connected together so as to form and maintain the acute angle therebetween, the wiper arm can be set to the lowermost position along the edge of the windscreen. Consequently, the external appearance can be improved, and the field of view from the passenger compartment can be widened.

According to the third aspect of the invention, since the lever portion and the wiper arm are coupled together via the connecting member having the length which is larger in value than the thickness of the windscreen, and the pivot shaft is provided inside the vehicle, only the wiper arm is disposed on the surface of the windscreen, whereby the external appearance can be improved.

What is claimed is:

1. A wiper system comprising:
   a rotating center spindle rotated by a wiper motor,
   a lever portion provided on the rotating center spindle,
   a wiper arm spaced from said level portion
   a connecting member attaching said wiper arm to said lever portion, and
   a wiper blade attached to the wiper arm, so that a windscreen can be wiped by the wiper blade, wherein
   the lever portion is constructed such that a rotating center of the lever portion which is located at one end thereof is provided at a position which is situated between a proximal end portion and a free end portion of the wiper arm and spaced away from the wiper arm by a predetermined distance toward a center of the windscreen, when the wiper arm is situated at a stop position where the wiper arm is located at a lower edge of the windscreen, and such that the other end of the lever portion extends beneath the proximal end portion of the wiper arm.

2. The wiper system as set forth in claim 1, wherein
   when the windscreen is viewed from a surface side thereof, the rotating center spindle is disposed at a position displaced towards the center of the windscreen from the edge thereof,
   the lever portion provided on the rotating center spindle extends such that a distal end thereof always protrudes from the edge of the windscreen, and
   the lever portion and the wiper arm are integrally connected together so as to form and maintain an acute angle therebetween.

3. The wiper system as set forth in claim 1, in combination with a vehicle and wherein
   the lever portion and the wiper arm are coupled together via the connecting member having a length larger in value than a thickness of the windscreen, and
   the rotating center spindle is provided inside the vehicle.

\* \* \* \* \*